United States Patent [19]

Bourgeois

[11] 4,289,346
[45] Sep. 15, 1981

[54] COLLAPSIBLE PROTECTIVE COVER MECHANISM

[76] Inventor: Norman J. Bourgeois, P.O. Box 1317, Orange, Tex. 77630

[21] Appl. No.: 970,521

[22] Filed: Dec. 18, 1978

[51] Int. Cl.³ .............................................. B62D 25/06
[52] U.S. Cl. .................................... 296/105; 296/100
[58] Field of Search ............... 296/100, 102, 104, 105, 296/109, 171, 175, 26

[56] References Cited

U.S. PATENT DOCUMENTS

| | | | |
|---|---|---|---|
| 2,193,352 | 3/1940 | Thomas | 296/171 |
| 2,243,659 | 5/1941 | Thompson | 296/175 |
| 3,342,523 | 9/1967 | Lutgen | 296/100 |
| 3,400,973 | 9/1968 | Heroy | 296/100 |
| 3,481,645 | 12/1969 | Stepp | 296/105 |

Primary Examiner—John J. Love
Assistant Examiner—Ross Weaver
Attorney, Agent, or Firm—Gunn, Lee & Jackson

[57] ABSTRACT

A collapsible and extendable protective cover mechanism for storage areas includes a pair of elongated guide tracks positioned in parallel relation on either side of the area to be protected. A plurality of cover segments, each having side portions interconnected by a top portion are positioned with the lower extremities of the side portions in guided engagement with the elongated track means. A power actuator system is interconnected with at least one of the cover segments and, when energized, causes simultaneous movement of the side portions of at least one of the segments, causing the protective cover mechanism to move toward a collapsed position where a majority of the area is exposed or an extended position where substantially all of the area is covered and protected. A single drive motor of the power actuator mechanism functions through a chain drive to cause simultaneous rotation of threaded members that are secured at either side of the area to be protected. An internally threaded connecting element is received by the rotatable threaded elements and is movable linearly upon rotation of the threaded elements. Threaded pins establish connection between the lower portions of at least one of the cover segments and the linearly movable connector element, thus resulting in linear movement of the cover segments upon selective energization of the drive motor.

16 Claims, 16 Drawing Figures

COLLAPSIBLE PROTECTIVE COVER MECHANISM

FIELD OF THE INVENTION

This invention relates generally to protective covers for enclosing either fixed or movable storage areas and, more specifically, is directed to a collapsible and extendable protective cover mechanism that may be selectively energized for movement to a collapsed position where a majority of the area is exposed and an extended position where substantially all of the area is covered and protected.

BACKGROUND OF THE INVENTION

Although the present invention is discussed herein particularly as is related to movable storage areas, such as the beds of vehicles such as trucks, trains, boats, etc., it is not intended to restrict use of the invention in conjunction with such movable storage areas. It is to be understood that the invention is readily applicable to static storage areas, such as outdoor areas, where goods may be temporarily stored.

In the handling of goods in connection with static storage areas and the beds of vehicles, it is desirable to have overhead access to these areas in order that the goods may be handled more efficiently. Where the vehicle is small, such as a pickup truck, a person loading or unloading goods from the bed of the truck can accomplish this task more easily if the pickup bed structure is not covered. In order to protect the goods contained in the bed of the vehicle from damage by wind, rain, etc., many trucks are provided with protective covers that permanently enclose the bed structure of the vehicle. In order to load or unload a covered truck bed, the person accomplishing this task will typically bend over during such loading and unloading operations. Loading and unloading, therefore, is typically a slow procedure when the truck bed is covered and the personnel must suffer the disadvantage of working under the low overhead of the cover.

Where large transport trucks are loaded with heavy goods, it is frequently desirable to utilize a crane in order to accomplish loading and unloading operations. Where a crane is to be utilized it is, of course, desirable that the truck bed be uncovered to facilitate overhead clearance for manipulation of the goods with the crane. For transporting, however, it is usually desirable that the goods be provided with some sort of protective covering to insure arrival of the goods in excellent condition at the time of arrival at the delivery site. For open trucks it is frequently necessary that the goods be wrapped with a protective cover that is secured in place about the goods and truck bed in order to prevent contamination or deterioration during transporting. Flexible protective covers, such as canvases and plastic wrapping, tend to deteriorate very rapidly during transporting due to wind induced movement and buffeting thereof. Obviously, deterioration of flexible covers in transit adds materially and adversely to the expenses of transportation.

It is therefore a primary feature of the present invention to provide a novel collapsible and extendable protective cover mechanism that is readily adaptable for use in conjunction with movable storage areas, such as the storage beds of vehicles, and is also adaptable for use in conjunction with static storage areas.

Another feature of the present invention concerns the provision of a collapsible and extendable protective cover mechanism that is capable of being retracted to a collapsed position in order to expose a majority of the storage area involved and is extendable to a position where substantially all of the storage area is protectively enclosed.

It is also a feature of the present invention to provide a novel collapsible and extendable protective cover mechanism incorporating a power actuation system to accomplish movement of the protective cover mechanism to the collapsed or extended positions thereof.

It is also a feature of this invention to provide a novel collapsible and extendable protective cover mechanism that is operative by the operator or a vehicle simply by selective actuation of a control system located within the driver's compartment of the vehicle.

Another feature of the present invention concerns a collapsible and extendable protective cover mechanism incorporating a plurality of substantially rigid segments that are movable into nesting relation at the collapsed position thereof to expose a majority of the storage area.

Another feature of this invention concerns the provision of a collapsible and extendable protective cover mechanism that incorporates interlocking, substantially rigid segments that include seal means to prevent air and water leakage between the segments when the cover mechanism is positioned at the extended position thereof.

Another feature of the present invention concerns the provision of a collapsible and extendable protective cover mechanism for large storage areas, such as the beds of transport trucks, wherein the cover mechanism incorporates a flexible cover that is collapsible in accordian manner to expose a majority of the storage area for overhead work.

Other and further objects, advantages and features of the invention will become obvious to one skilled in the art upon an understanding of the illustrative embodiments about to be described, and various advantages not referred to herein will occur to one skilled in the art upon employment of the invention in practice.

SUMMARY OF THE INVENTION

In one embodiment of the present invention, a collapsible and extendable protective cover mechanism for storage areas may incorporate a plurality of generally rigid cover segments each having side portions interconnected by a top or cover portion. Each of the rigid cover segments is of a different size whereby in the collapsed position of the cover mechanism the various cover segments will be positioned in nesting relation and a majority of the storage area will be exposed. Each of the cover sections is provided with hook like portions at each extremity thereof and the hook like portions of adjacent segments cooperate with one another to establish hooked interconnection between the segments when the cover mechanism is fully extended to a position fully closing the storage area to be protected. To prevent the leakage of air or water at the joints between the connected segments, the hook like interconnections between the segments incorporate seal elements that establish air and water tight sealing when the cover mechanism is extended. The sealing elements also provide cushioning to secure the various segments of the cover mechanism against vibration and rattling during use.

The retractable and extendable cover mechanism is provided with a power actuation system incorporating a pair of elongated, externally threaded drive elements that are rotatably positioned on each side of the area to be protected. Where vehicles are concerned, the threaded elements are rotatably secured to the internal or external portions of the vehicle bed structure. A pair of internally threaded driven connector elements are received by the externally threaded drive element and each of these driven elements is interconnected with at least one of the cover segments by a pair of connector pins. Upon rotation of the elongated threaded drive members, the driven elements will cause linear movement of at least one of the segments. Other ones of the segments will be linearly movable by the power actuated segment as the power actuated segment is moved toward the collapsed or extended position thereof. Where the storage area to be protected is the bed portion of a truck, trailer, train or other vehicle, the rearmost one of the rigid segments will be driven by the power actuating mechanism and the driven segment will be the innermost segment upon collapsing of the protective cover mechanism. On extension of the protective cover mechanism, the driven internal segment, due to its hooked connection with the next adjacent segment will cause movement of the adjacent segment and other movable segments toward the extended position thereof. Where nesting rigid segments are involved, a pair of guide elements will be positioned in substantially parallel relation at the sides of the storage area. The elongated guide tracks will incorporate a plurality of parallel guide slots each receiving roller support elements connected to selected ones of the rigid cover segments. As the cover segments are moved into nesting relation, the guide rollers will be positioned in side by side relation within respective ones of the guide slots of the elongated guide tracks.

In another embodiment of the present invention, especially usable in conjunction with large storage areas, such as the beds of transport trucks, trailers, trains, etc., an elongated guide track will be positioned on either side of the bed of the vehicle. A plurality of support ribs will be provided, each having roller supports at the lower portions thereof that are received within the guide track. A power actuating system will be provided as indicated above and the rearmost one of the ribs will be interconnected at the lower portions thereof with the power actuation system, thereby causing the rearmost rib to be moved linearly toward the collapsed or extended position of the cover mechanism. A flexible cover will be provided about the rib elements with the protective cover being secured to the rib elements at spaced locations therealong. As the protective cover is extended by collapsing or extending movement of the rearmost one of the ribs, the ribs and cover will be likewise extended or collapsed. The flexible cover will collapse in accordian like manner upon being moved to the collapsed position thereof.

BRIEF DESCRIPTION OF THE DRAWINGS

In order that the manner in which the above-recited advantages and objects of the invention are attained, as well as others which will become apparent, can be understood in detail, more particular description of the invention briefly summarized above may be had by reference to the specific embodiments thereof that are illustrated in the appended drawings, which drawings form a part of this specification. It is to be understood, however, that the appended drawings illustrate only typical embodiments of the invention and are therefore not to be considered limiting of its scope, for the invention may admit to other equally effective embodiments.

In the drawings.

DETAILED DESCRIPTION OF PREFERRED EMBODIMENTS

Figure 1:
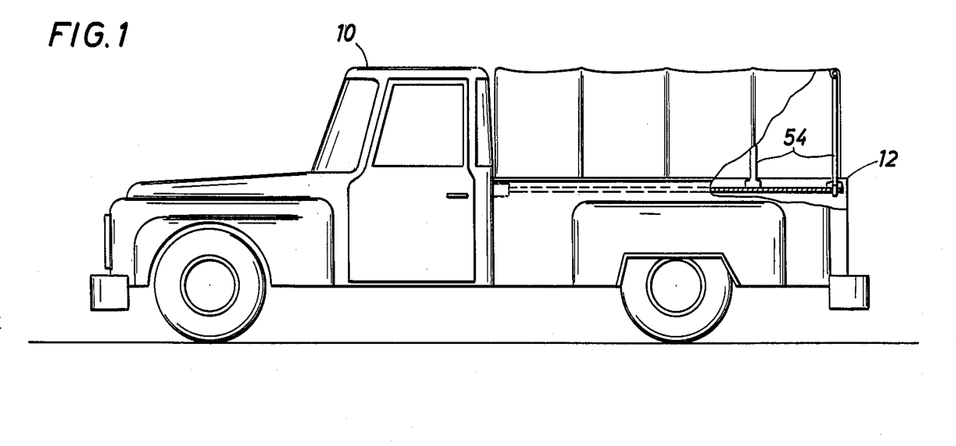
FIG. 1 is a pictorial representation of a small truck incorporating a collapsible and extendable protective cover mechanism constructed in accordance with the present invention having a portion of the structure of the cover mechanism broken away and shown in detail.
Figure 2:
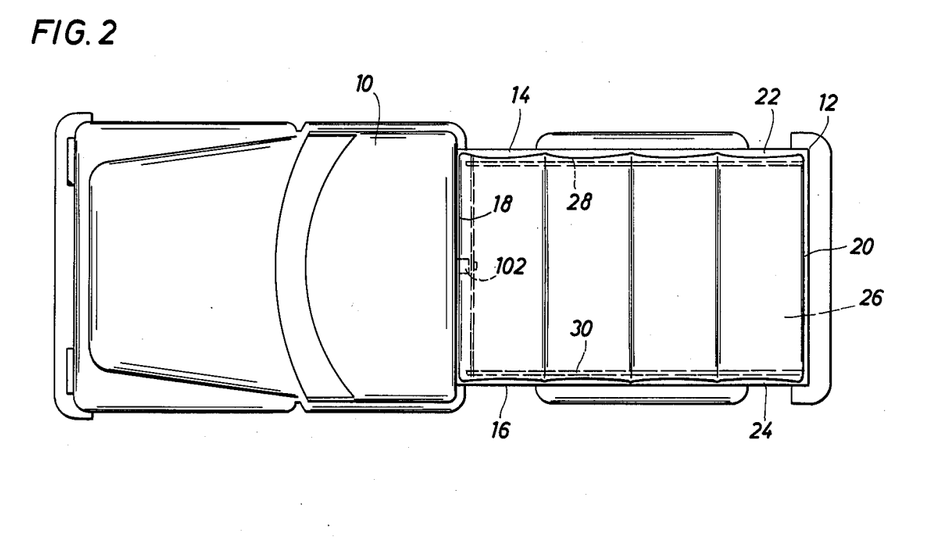
FIG. 2 is a top pictorial view illustrating the truck and cover structure of FIG. 1.

Now referring to the drawings and first to FIG. 1, there is depicted a truck 10 having a bed portion 12 defining an elongated, generally rectangular area to be protected from the elements. As shown in FIG. 2, the truck bed 12 is defined by side wall members 14 and 16, a front end wall member 18 and a rear wall 20. The rear wall, especially in pickup truck type structures, is generally pivotable downwardly, and is generally referred to as a tailgate. The side wall members 14 and 16 define generally flat upper surfaces 22 and 24, respectively, that extend the length of the bed structure. The truck bed is also defined by a substantially flat bed portion 26 on which goods or objects rest during transportation and storage.

Figure 3:
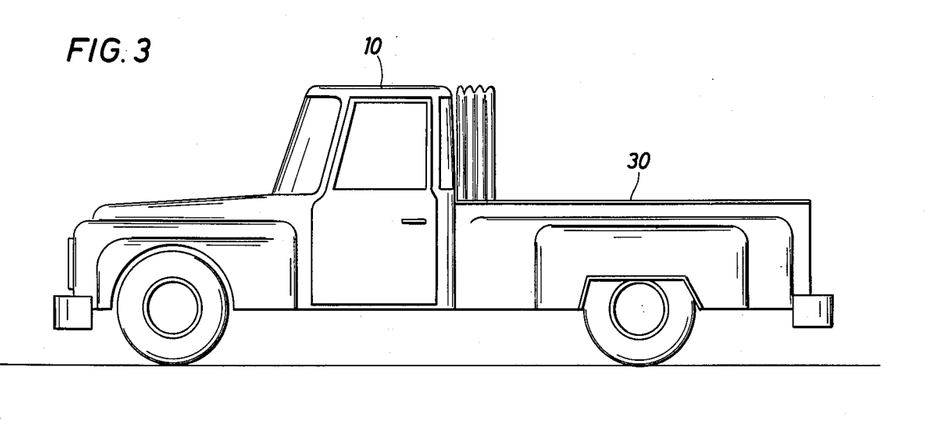
FIG. 3 is a pictorial representation of the truck and cover structure of FIGS. 1 and 2, illustrating the cover in its collapsed or retracted position exposing a majority of the truck bed.

Many truck beds and other vehicle beds are open top structures such as that illustrated in FIGS. 1, 2 and 3 and any goods contained therein are logically exposed to the sun, wind, rain, snow, dirt, etc. of the outdoor environment. In many cases it is desirable to provide protection for the goods or objects contained within the vehicle bed structure during storage and transportation to protect the same from deterioration during transportation and storage in the vehicle bed structure. Frequently, small truck bed structures, such as those illustrated in FIGS. 1–3, are provided with rigid covers that are secured in place by bolting or by any other suitable means. These rigid covers, typically referred to as camper tops where pickup type trucks are concerned, provide adequate protection for the goods and objects contained within the truck bed, but such structures are not entirely satisfactory for general utilitarian use. If the objects or goods transported by the truck structure are of quite heavy or of large and cumbersome nature, it may be extremely difficult to load such goods into the bed structure. Workmen accomplishing the loading operation must generally work in a stooped over condition and are likely to become injured or overworked when working under such conditions. In many cases, the goods required to be loaded and unloaded from the vehicle bed structure are sufficiently heavy that mechanized means, such as cranes, forklifts, etc., are necessary to accomplish such loading and unloading. Under circumstances where a truck or other vehicle is enclosed by a rigid cover structure, mechanized loading operations are typically extremely difficult and, in many cases, impossible. It is desirable, therefore, to provide a cover mechanism for the bed structures of a vehicle and, according to the present invention, a suitable cover mechanism may conveniently take the form illustrated in FIGS. 1, 2 and 3. This cover mechanism is extendable to a position illustrated in FIGS. 1 and 2 where a covering is provided for the entire bed structure of the vehicle, thus providing maximum protection for goods contained therein. As shown in FIG. 3, the protective cover structure is retractable to a collapsed position where a majority of the vehicle bed structure is exposed, allowing loading and unloading operations by mechanized means and providing workmen with unlimited overhead working space to simplify manual loading and unloading operations.

Figure 4:
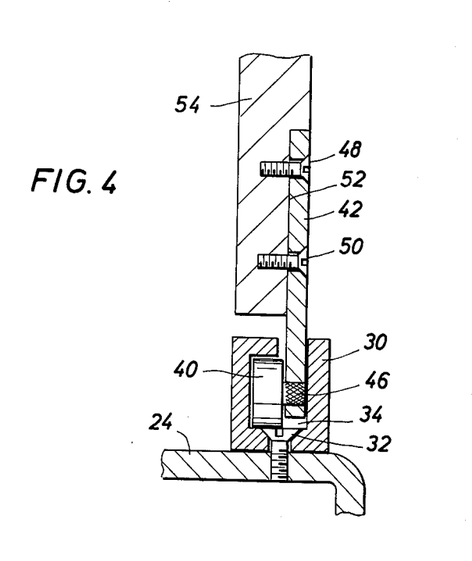
FIG. 4 is a fragmentary sectional view of one of the lower portions of a cover support rib structure, illustrating the roller supports thereof in assembly within a guide track connected to a vehicle bed structure.

In accordance with the present invention, and as shown in FIGS. 2 and 3, a pair of elongated guide tracks 28 and 30 are secured to the upper planar surfaces 22 and 24 of the truck bed structure by bolting or by any other suitable means of connection. As shown in FIG. 4, the elongated guide track 30 is shown to be connected to the planar surface portion 24 of the vehicle bed structure by a plurality of screws 32. Although shown to be connected at the immediate inside portion of the vehicle bed structure, logically, the guide track 30 may be located at any suitable position on the planar surface portion of the vehicle bed structure within the scope of this invention.

Figure 5:
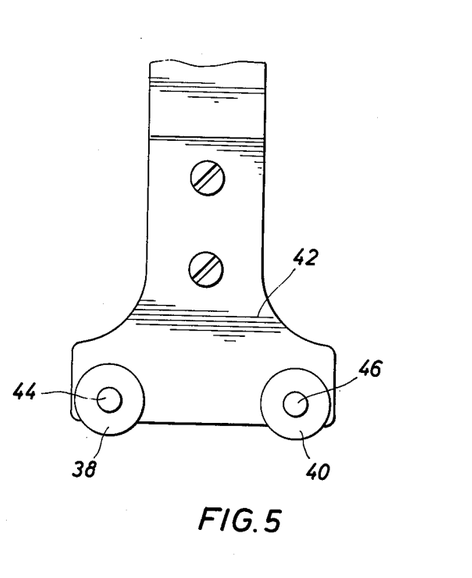
FIG. 5 is a pictorial representation illustrating the guide roller support of FIG. 4.
Figures 6, 14:
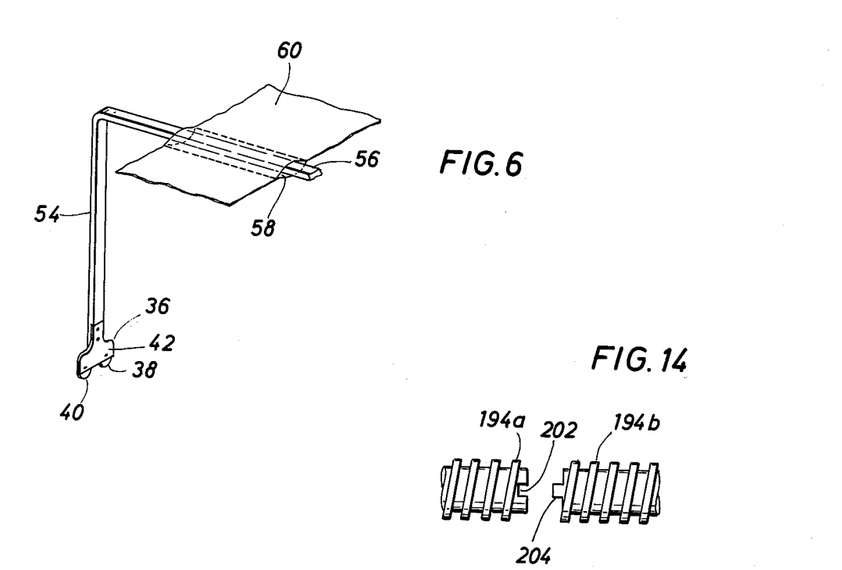
FIG. 6 is a fragmentary isometric view illustrating a portion of the rib structure of FIG. 4 and showing attachment thereof to the flexible cover of the protective cover mechanism.
FIG. 14 is a fragmentary elevational view of a portion of the interconnected drive shafts of the structure of FIG. 12 illustrating the driving connection established between the drive shafts.

The guide track structure defines an elongated groove 34 that is adapted to receive roller guide assemblies 36 each having a pair of rollers 38 and 40 as shown in FIG. 5 that are secured to a support plate 42 by pivot elements 44 and 46, respectively. As shown in FIG. 4, screws 48 and 50 extend through openings in the support plate 42 and secure the support plate to an inside surface 52 defined at the lower extremity of a rib element 54. As shown in FIG. 6, each of the rib elements 54 are formed to define upright portions at either side of the vehicle bed structure that are joined together by a top support portion 56 of the desired configuration for defining the general profile of the roof portion of the protective cover.

Each of the support ribs 54 is threaded through a supporting tube 58 of a flexible cover 60 in the manner illustrated by the fragmentary view of FIG. 6. The support tube 58 of the cover is received by the side and top portions of each of the ribs in the manner shown in FIG. 6. The flexible cover 60 may be composed of any suitable flexible material, such as treated canvas, plastic or any other suitable material. As the cover is moved to the extended position thereof, as shown in FIGS. 1 and 2, the roller assemblies of each of the ribs will move within the elongated groove 34 of the guide track to a proper position for adequate support of the roof structure. As the cover is collapsed to the position shown in FIG. 3, the rib members will move along the track structure into substantially side-to-side relationship and the cover will fold in accordian like manner, thus exposing a majority of the bed structure of the vehicle for loading and unloading operations.

It is desirable to accomplish extension and retraction of the protective cover mechanism with minimal effort and to accomplish the same while the operator of the vehicle is located in the driver's compartment of the vehicle. In some cases, it will be desirable to accomplish retraction of extension of the protective cover mechanism while the vehicle is moving. These features are conveniently accomplished by providing power actuated apparatus that moves the rearmost rib member, which may be referred to as a master rib, toward or away from the vehicle cab structure. The power actuation mechanism is illustrated in detail particularly in FIGS. 8, 10 and 11 in connection with a modified embodiment of the present invention incorporating a protective cover structure including a plurality of substantially rigid cover segments. The structure and operation of the power actuation mechanism will be discussed in detail hereinbelow.

Figure 7:
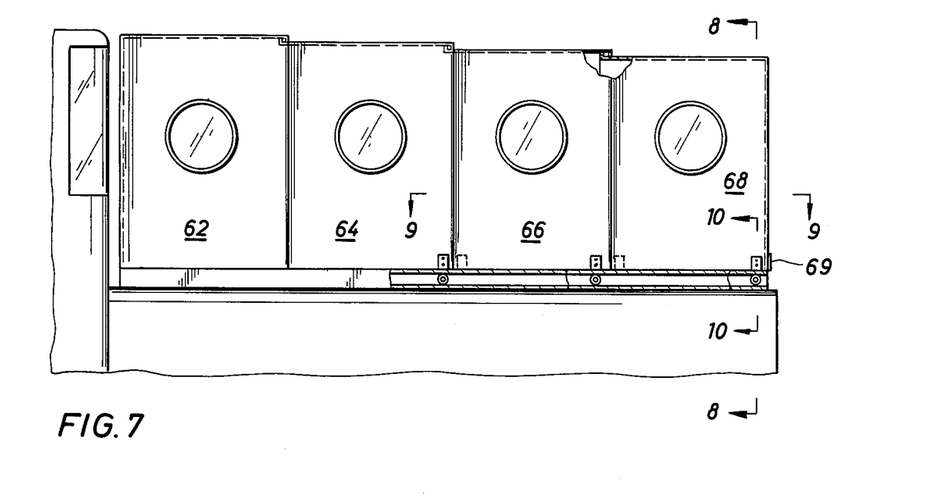
FIG. 7 is a partial side elevational view of a truck having a collapsible and extendable protective cover mechanism that represents an alternative embodiment of the present invention, the cover mechanism being shown in its extended position with portions of the structure broken away and shown in detail.
Figure 8:
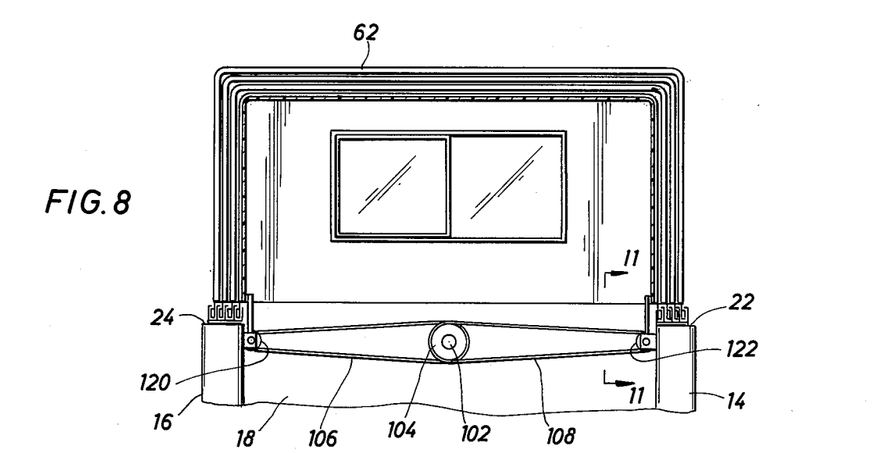
FIG. 8 is a partial rear end view of the truck and cover structure taken along line 8—8 of FIG. 4 and illustrating the nesting relationship of the cover segments.

Referring now particularly to FIGS. 7 and 8, the protective cover mechanism is shown to include four substantially rigid cover segments 62, 64, 66 and 68. The forward cover segment 62 is the larger of the cover segments and is intended to remain stationary on the vehicle bed structure by virtue of a pinned connection, or any other suitable form of attachment. Cover segments 64, 66 and 68 are of successively smaller dimension, each being receivable within the other in order that segments 64, 66 and 68 may be received within cover segment 62 in the fully collapsed condition of the protective cover mechanism.

As the master segment 68 moves forward toward the collapsed or retracted position, it is intended that the master segment cause collapsing or retracting movement of the intermediate segments 64 and 66. One suitable means for accomplishing this feature is provided by a drive plate 69 that is fixed to the rearmost portion of the master segment and extends outwardly a sufficient distance for driving engagement with the rear portions of the intermediate segments. Drive plate 69 is secured to the rear portion of the master segment in any suitable manner, such as by a plurality of bolts 71. As the master segment moves forwardly, the drive plate successively engages intermediate segments 66 and 64, driving them forward into nesting relation within the immovable segment 62.

Figure 10:
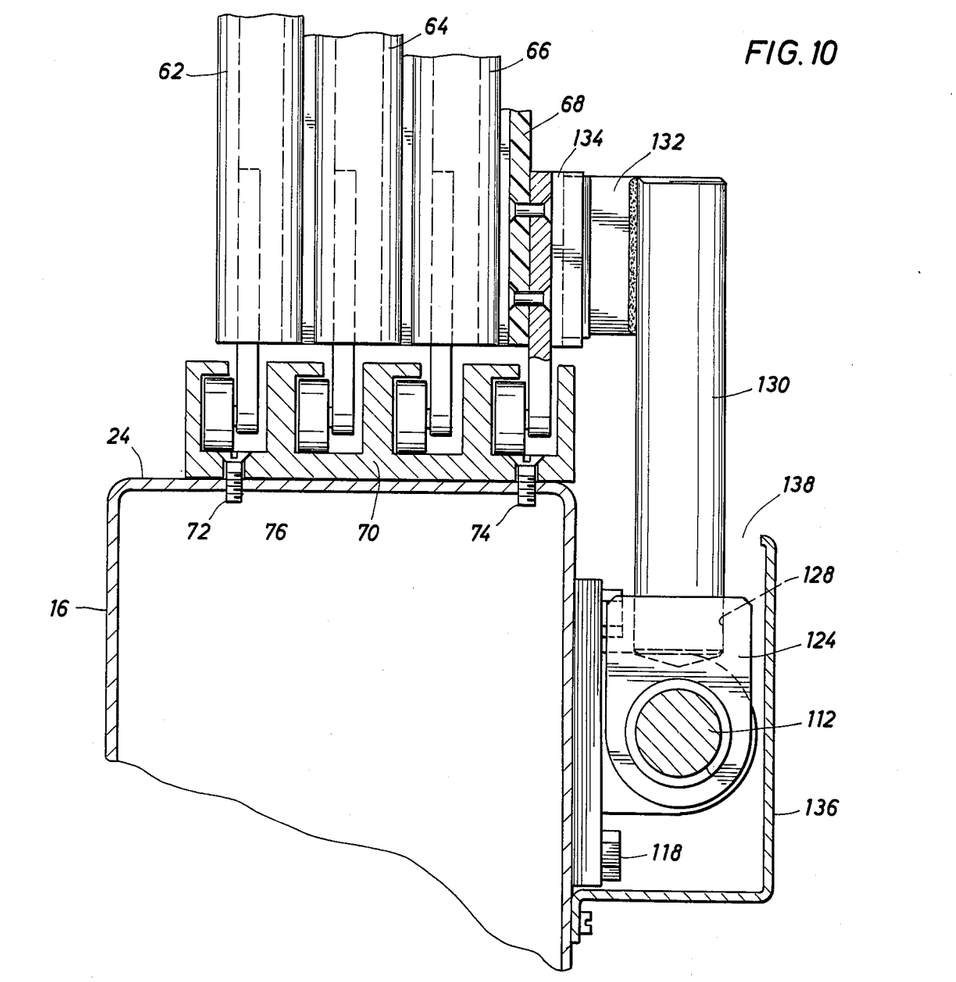
FIG. 10 is an enlarged sectional view taken along line 10—10 of FIG. 7 and illustrating the guide track structure of the cover mechanism and the driving interconnection between the power actuating mechanism and the cover structure.

Referring now to FIG. 10, an elongated guide track structure 70 may be secured to the upper planar surface 24 of the vehicle bed structure by means of screws 72 and 74, or by other suitable means of connection. The elongated guide track structure 70 is formed to define four elongated guide grooves, one of which is illustrated by reference character 76. The guide roller assemblies of respective ones of the cover segments are receivable within respective ones of the guide tracks in order that the roller assemblies may be positioned in side-to-side relationship when the protective cover mechanism is fully collapsed. Each of the roller assemblies is constructed in the manner discussed above in connection with FIGS. 4 and 5 and is secured to the substantially rigid side portions of each of the cover segments by screws, bolts, or any other suitable form of connection.

Figure 9:
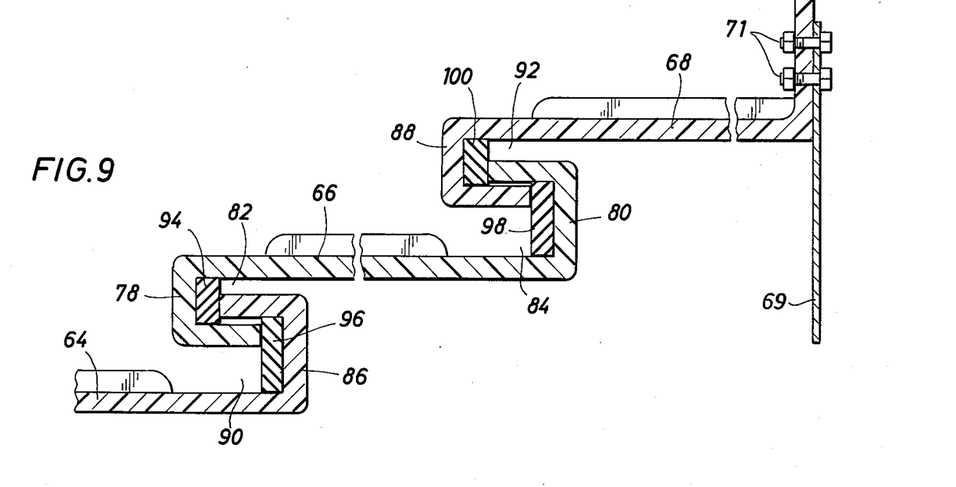
FIG. 9 is a fragmentary sectional view taken along line 9—9 of FIG. 7 and illustrating the hook like interconnections between the rigid segments of the cover mechanism.

Because the rigid cover structure of FIG. 7 is segmented, as shown, it is desirable to provide means for insuring against leakage of air or water past the joints between the segments in the extended condition of the protective cover structure. As shown in FIG. 9, the various segments are formed to define opposed interengaging hook like portions that secure the segments in assembly. Additionally, seal means prevents leakage of air and water at the joints between the segments when the cover mechanism is fully extended. As shown in FIG. 9, which is a section taken along line 9—9 of FIG. 7, segment 66 is formed to define opposed hook portions 78 and 80 defining elongated recesses 82 and 84, respectively. The adjacent cover segments 64 and 68 also define connecting portions 86 and 88, respectively, that also define elongated recesses 90 and 92. Elongated sealing members 94, 96, 98 and 100 are received within respective ones of the recesses defined by the hook shaped portions and are engaged by the extremities of opposite hook shaped portions of adjacent segments in order to define a fluid tight seal preventing air and water from leaking at the joints between the various cover segments. Moreover, the joint arrangement is such that the natural flow of air and water from a moving vehicle will not tend to enter the joints between segments but rather will flow rearwardly over the segmented cover structure without entering at any of the joints. While the vehicle is stationary, any rain or wind will be prevented from entering the joints between the segments by virtue of the double seal established by the cooperating sealing members and hooked connection portions of the segments. The resulting cover structure is substantially airtight and watertight when extended to the position illustrated in FIG. 7.

Figure 11:
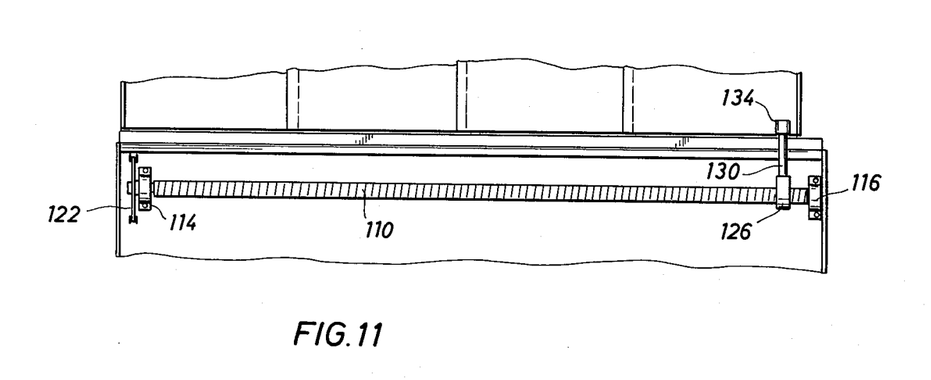
FIG. 11 is an enlarged view taken along line 11—11 of FIG. 8 and illustrating the power actuating mechanism of the cover structure.

The flexible protective cover structure illustrated in FIGS. 1, 2 and 3 and segmented protective cover structure illustrated in FIGS. 7-10 may be operated by substantially identical power actuation mechanisms. As shown in FIGS. 2, 8, 10 and 11, a drive motor such as an electric motor 102 may be connected to the forward wall structure 18 of the vehicle and may be provided with a sprocket structure 104 including a pair of sprockets that impart driving movement to a pair of drive chains 106 and 108. Along opposite sides of the vehicle bed structure is rotatably supported a pair of threaded shaft members 110 and 112. As shown in FIG. 11, each of the threaded shafts is rotatably supported by forward and rear support brackets 114 and 116 that are suitably connected to the side wall structure of the vehicle bed by bolts 118 in the manner shown in FIGS. 10 and 11. Support brackets 114 and 116 are provided with suitable bearing elements for rotatable support of the threaded shafts. At the forward extremity of each of the threaded shafts is provided a sprocket member 120 and 122 that receives respective ones of the chain drive elements 106 and 108. The sprocket members 120 and 122 are connected in nonrotatable relation with the respective threaded shaft 110 and 112 and thus rotation of sprockets 120 and 122 by the drive chains responsive to actuation of the drive motor 102 causes simultaneous rotation of the threaded shafts.

A pair of traveler elements 124 and 126 are formed to define an internally threaded opening that is received by the external threads of the respective threaded shafts 110 and 112. As shown in FIGS. 10 and 11, each of the traveler elements is formed to define a connecting pin receptacle 128 that is adapted to receive a key pin 130 having a dovetail connector element 132 at the upper extremity thereof. Connector element 132 incorporates the external portion of a dovetail connection while a member 134 defining an internal dovetail connecting groove is secured to the lower portion of the master cover segment 68. Thus, connector pins are utilized to establish a releasable connection between the master cover segment or master rib and the respective traveler element on each side of the master cover segment or rib. Through this manner of connection, simultaneous linear movement of the traveler elements 124 and 126 cause consequent simultaneous movement of each side of the master rib or master segment portions of the protective cover mechanism. The master rib or segments will thus be moved linearly without the possibility that binding might occur that might otherwise hinder linear movement of the cover mechanism.

The connection between the cover mechanism and the traveler elements is releasable in order that the entire cover structure may be simply and efficiently removed from or assembled to the vehicle structure as desired. For example, in the event it is desirable to remove the protective cover structure from the vehicle, the drive motor 102 will be energized so as to move the cover mechanism to its collapsed position. Alternatively, the connection between the cover mechanism and traveler may be released simply by moving the connector pins 130 upwardly disassembling the lower extremities thereof from the pin receptacles 128. After the protective cover has been moved to its collapsed position, the releasable connection between the forward extremity of the protective cover and the bed may be disengaged, thereby allowing all of the segments or ribs to be free for linear movement within the respective roller tracks. The entire collapsed cover assembly is then moved linearly toward the rear of the vehicle until the support roller assemblies move outwardly of the guide track grooves. The cover mechanism may be stored safely until utilization is again desired.

In order to assemble the protective cover mechanism to a vehicle structure, the collapsed protective cover is simply guided relative to the guide track structure such that the respective support roller assemblies enter appropriate ones of the elongated grooves provided therefor. In the case of the flexible cover assembly illustrated in FIGS. 1, 2 and 3, guide roller and track assembly can be of more simple nature since only a single guide groove can be defined by the guide track structure on either side of the vehicle bed structure. For the sake of simplicity and interchangeability, the multi-guide groove track structure illustrated in FIG. 10 is preferable. In the case of the structure illustrated in FIG. 10, each of the guide roller assemblies for each of the segments must be located within respective ones of the guide grooves provided therefor.

Protection for the elongated threaded shafts 110 and 112 is provided by shaft cover structures 136 that are connected to the vehicle bed structure and surround all but the upper portion of the elongated shafts. The shaft cover cooperates with the vehicle bed structure to define an elongated groove 138 within which the key pins 130 are allowed to move linearly as the respective travelers are moved linearly by the rotating threaded shafts. The drive motor 102 is energized by electrical power supplied by the battery of the vehicle or by any other suitable power source under control by an electrical circuit incorporating suitable switching means to accomplish starting, stopping and reversing of the electric motor. Control switches for the circuitry may be positioned within the driver's compartment of the vehicle or at any other suitable remote location for achieving selective operation of the power actuating mechanism. For vehicles such as trailers, trains and for static storage sites, the collapsible and extendable protective cover mechanism may be energized by an electric motor or any other suitable power equipment within the spirit and scope of the present invention.

Referring now to FIGS. 12-16, a further modified embodiment of the present invention is depicted wherein large transport trucks may be provided with a retractable protective cover mechanism constructed in accordance with this invention. Although FIGS. 12-16 relate particularly to a protective cover mechanism for transport trucks, it is intended that such structure be applicable to other vehicle structures, such as trains, trailers, boats, etc., and that it also be applicable to provide selective protection for static work sites that may be selectively covered or uncovered as desired for protective covering of or access to goods that are located within the protected area.

Figure 12:
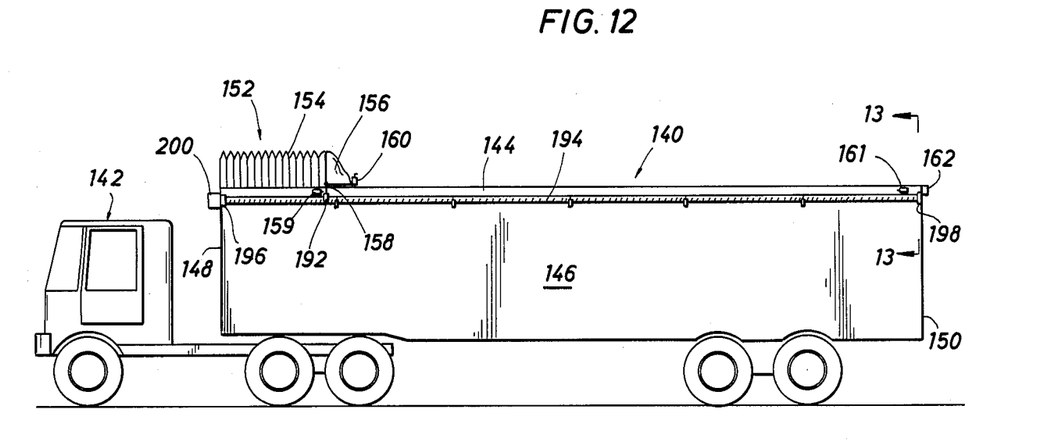
FIG. 12 is an illustration of a transport truck vehicle incorporating a retractable and extendable protective cover mechanism constructed in accordance with the present invention.

As shown particularly in FIG. 12, a transport truck vehicle is generally indicated at 140 having a tractor portion 142 and a trailer portion 144. The trailer portion of the transport truck incorporates side walls 146, a forward end wall 148 and a rear end wall 150. If the trailer structure is a dump type vehicle for transporting frangible goods, such as sand, gravel, grain, etc., the rear end wall portion 150 will be movably supported and positionable to facilitate dumping of the goods.

The trailer structure is provided with a collapsible and extendable protective cover mechanism illustrated generally at 152 incorporating a flexible covering 154 of sheet material such as canvas, plastic, etc., and which is capable of collapsing in accordian like manner as discussed above in connection with FIG. 3. The cover is extendable to cover the entire upper portion of the trailer structure in the manner discussed above in connection with FIGS. 1 and 2. The protective cover structure may also be provided with a rear end cap portion 156 that covers the rear end portion of the trailer in the fully extended condition of the cover mechanism. The end cap 156 may be formed of the same material as other portions of the cover structure and may be supported by a pivotal connection structure 158 in order that the rear cap may be pivotable downwardly into engaging and protecting position relative to the rear portion of the trailer structure. The rear end cap portion may also be provided with a locking mechanism 160 capable of being received in locking relation with a locking receptacle 162 provided at the rear portion of the trailer structure. When the protective cover mechanism is fully extended, the locking mechanism 160 may be brought into locked relation with the receptacle 162 in order to establish a positive locked and sealed connection between the rear portions of the cover and trailer structures.

Figure 13:
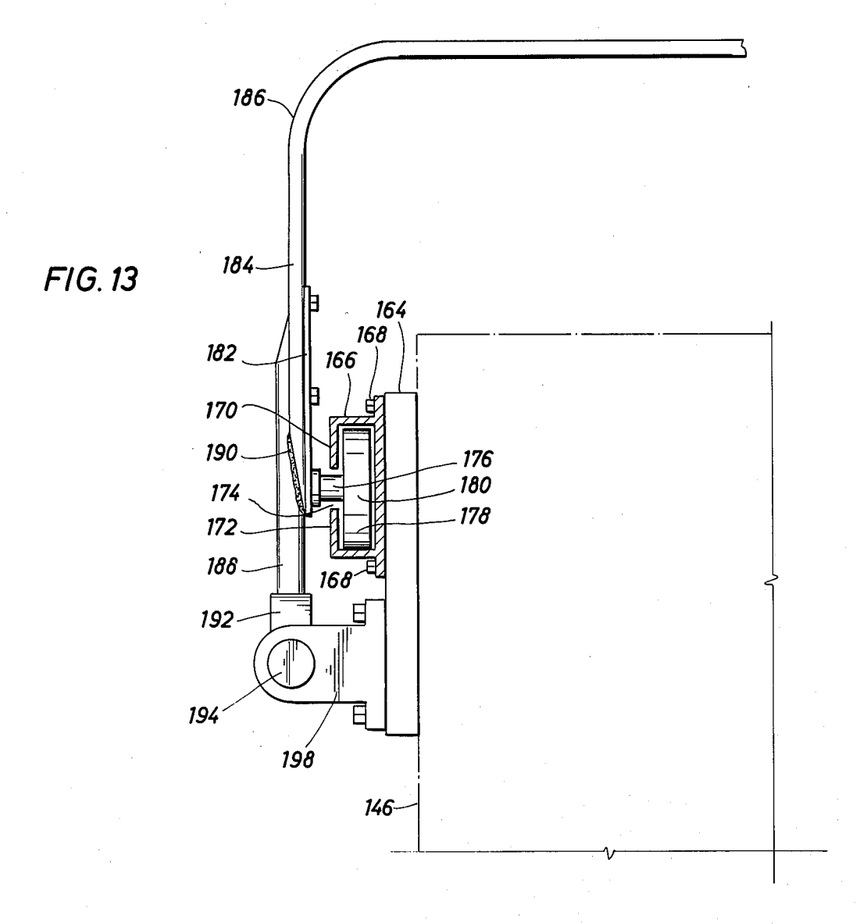
FIG. 13 is a partial sectional view taken along line 13—13 of FIG. 12 and illustrating the master cover support rib and its driving connection with the power actuator mechanism for operation thereof.

The protective cover mechanism 152 of FIG. 12 will also be provided with a power actuation system to accomplish collapsing and extending movement of the cover mechanism under selective control by the operator of the vehicle. As shown in FIG. 13, the side walls 146 of the trailer structure incorporate an external stiffener element 164 extending lengthwise along the entire length of the respective side walls. Typically, the stiffener element will be connected to the side wall structure by welding, or by any other suitable form of connection. An elongated guide track 166 may be secured to the upper portion of the stiffener element 164 and will also extend along the entire length of the side wall structure of the trailer. The guide track 166 may be defined by a plurality of elongated segments that are placed in end-to-end registering relationship so as to define sufficient length for collapsing and extending movement of the supports for the cover mechanism. The guide track may be secured to the stiffener structure by means of bolts 168, or by other suitable means as desired. The guide track is of generally C-shaped cross-sectional structure defining upper and lower exterior wall portions 170 and 172 that cooperate to define an intermediate elongated groove 174 that allows linear traversing of the axle portion 176 of support rollers 178 that are movably positioned within the guide track 166.

The axle portions 176 of the respective guide rollers are rotatably supported by bearings 180 provided at the lower extremity of a support plate 182. The support plate of each of the roller assemblies is connected by bolting, welding, etc. to upright portions 184 of rib members 186. The flexible cover 154 is provided with rib receiving tube portions as illustrated at 58 in FIG. 6 which receive the cover support ribs 186 in similar manner. For imparting collapsing and extending movement of the cover mechanism, the rearmost one of the ribs is typically referred to as the master rib, as discussed above. The master rib is driven linearly to accomplish extension and collapsing movement and the intermediate ribs are movable by the master rib and cover structure within the elongated guide track 166. As shown at the lower portion of FIG. 13, the master rib will include a rib drive extension 188 that is secured to the upstanding portion 184 of the rib 186 by means of welding such as shown at 190 or by any other suitable means of connection. The rib drive portion 188 is receivable in connection with a traveler element 192 having an internally threaded aperture that receives an externally threaded elongated shaft 194. As shown in FIGS. 12 and 13, shaft support bracket and bearing structures 196 and 198 are secured to the stiffener member 164 in any suitable manner and provide rotatable support for the extremities of the elongated shaft 194. A motor energized power mechanism 200 is interconnected in driving relation with shafts 194 on either side of the truck bed structure in the manner illustrated above in connection with FIG. 8. The power mechanism imparts simultaneous rotation of the shafts 194 in order to impart simultaneous linear movement to opposed side of the master rib of the protective cover mechanism.

Figure 15:
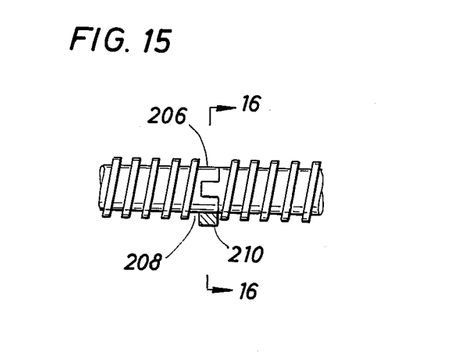
FIG. 15 is a fragmentary view of the drive shafts of FIGS. 12 and 14, illustrating the joined drive shafts and the support structure therefor.
Figure 16:
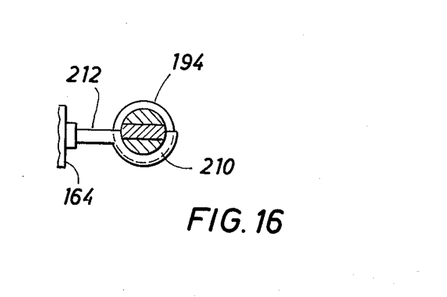
FIG. 16 is a view taken along line 16—16 of FIG. 15 and illustrating the support structure for each extremity of the drive shafts incorporated in FIG. 12.

In order to facilitate utilization of the protective cover mechanism, for vehicles of varying length, the elongated threaded shafts 194 may be segmented as shown in FIG. 12 and may be joined by a nonrotatable connection in manner illustrated in FIG. 14 in order that all of the shaft segments will be rotated simultaneously. As shown in FIG. 14, shaft segments 194a and 194b are slightly separated so as to illustrate the manner of connection therebetween. Shaft 194a is formed to define a transverse recess 202 within which is received a transverse projection or key 204 defined at the opposed extremity of the shaft segment 194b. With the shaft segments assembled, as shown in FIG. 15, the joint established at the connection between the shaft extremities defines a reduced diameter surface 206 defining an annular groove 208 that is adapted to receive the U-shaped support portion 210 of an intermediate support element 212 that is also secured to the stiffener element 164 of the trailer bed structure. The U-shaped support portion 210 of the support elements allow the traveler element 192 to pass over the various intermediate supports as it traverses the combined length of the various joined segments of the threaded shaft 194. The threaded portions of each of the shaft segments are arranged relative to the connecting slot and key portions 202 and 204 such that the traveler elements will readily transfer from the threaded portion of one shaft segment to the threaded portion of the adjoining shaft segment. Thus, the traveler element will readily traverse the entire length of the rotatable shaft 194 and will impart such linear movement to the master rib structure to cause extending or collapsing movement of the protective cover mechanism.

A pair of limit switches 159 and 161 are attached to the truck bed structure in any suitable manner and are engaged by the traveler element at the forward and rearward limits of retracting and extending movements. The limit switches are interconnected with the electrical control circuitry in such manner as to achieve motor cut-off when the traveler element has been moved to either of the forward or rearward limits determined by the limit switches. Although shown only in FIG. 12, the limit switch control arrangement is equally applicable to the structure illustrated in FIGS. 1–11.

Although the various features of this invention are described particularly in connection with truck and trailer structures and other types of vehicles. It is intended, however, that the invention be equally adaptable for providing selective protection for static storage and work area for which covered protection is desired at times. In view of the foregoing, it is evident that I have provided a novel protective cover mechanism that may be selectively retracted and extended as desired to provided protection for any suitable elongated area. In the extended position, the protective cover mechanism provides weather tight protection for the area involved. In the retracted position, the cover mechanism exposes a majority of the area in order to allow efficient access thereto by workmen, overhead hoist systems and other equipment for which unrestricted overhead height is desirable. The protective cover mechanism may be simply and easily removed from a vehicle structure without necessitating the use of special tools and equipment for installation or removal thereof. It is apparent, therefore, that the present invention is one well adapted to attain all of the objects hereinabove set forth together with other advantages which will become obvious and inherent from the foregoing description of the apparatus itself. It will be understood that certain combinations and subcombinations are of utility and may be employed without reference to other features and subcombinations. As many possible embodiments may be made of this invention without departing from the spirit or scope thereof. It is to be understood that all matters herein set forth or shown in the accompanying drawings are to be interpreted as illustrative and not in any limiting sense.

What is claimed is:

1. A collapsible and extendable telescoping protective cover mechanism for selectively covering and protecting the bed of a vehicle, said protective cover mechanism comprising:

a pair of elongated guide track elements being disposed in spaced generally parallel relation on either side of said area to be protected, each of said guide track elements defining a plurality of guide tracks;

a plurality of cover segments including generally upright and generally parallel side portions interconnected by a top portion, the lower portions of said side portions being received in movable guided relation by said guide track means, one of said cover segments adapted to be releasably secured in immovable relation with said vehicle bed and the other cover segments being movably received by said guide track means and being receivable in telescoping relation with said one cover segment, all of said cover segments being removable from said guide track means as a telescoped cover unit, exposing the entire vehicle bed; and power actuator means being positioned adjacent each of said guide track means and being interconnected with each side of at least one of said rigid elements, said power actuator means being operative to impart telescoping movement to the side portions of said cover segments to position said cover segments in telescoped position where a majority of said area is uncovered and an extended position where substantially all of said area is covered.

2. A collapsible and extendable protective cover mechanism as recited in claim 1, wherein:

said cover segments are each defined by generally rigid rib elements supporting an elongated flexible cover defining said side portions and said top, the lower side portions of at least the rearmost one of said rib elements being interconnected with said power actuator means, said flexible cover being connected to each of said rib elements and collapsing in accordian-like manner upon movement of said protective cover mechanism to the collapsed position thereof.

3. A collapsible and extendable protective cover mechanism as recited in claim 1, wherein:
said cover segments are each defined by generally rigid elongated portions, each having side and top portions, said cover segments being movable into nesting relation upon movement of said protective cover mechanism to the collapsed position thereof.

4. A collapsible and extendable protective cover mechanism as recited in claim 3, wherein:
each of said elongated guide track means defines a plurality of elongated track recesses disposed in generally parallel relation; and
each of said cover segments have guide roller means at the lower portions of said side portions, said guide roller means of each of said segments being movably received within respective ones of said elongated track recesses.

5. A collapsible and extendable protective cover mechanism as recited in claim 1, wherein said power actuator means comprises:
a pair of elongated threaded drive elements being rotatably supported in generally parallel relation to said guide track means;
power means adapted to cause simultaneous rotation of said threaded drive elements; and
internally threaded traveler means being received by said threaded drive elements, said traveler means being connected with at least one of said cover segments and imparting selective linear movement to said cover segments upon selective rotation of said threaded drive elements by said power means.

6. A collapsible and extendable protective cover mechanism as recited in claim 1, wherein:
the elongated area to be selectively covered is the bed portion of a vehicle, said pair of elongated guide track means being secured to the structure of said vehicle.

7. A collapsible and extendable protective cover mechanism as recited in claim 6, wherein the bed portion of said vehicle defines an elongated generally flat surface on either side of said bed portion and wherein:
said elongated guide track means is secured to said generally flat surfaces on either side of said bed portion and defines a plurality of generally parallel elongated guide grooves; and
guide roller means is provided on the lower portions of each of said cover segments, said guide roller means being receivable within selected ones of said elongated guide grooves.

8. A collapsible and extendable protective cover mechanism as recited in claim 1, wherein said area to be protected is an elongated area and said power actuator mechanism comprises:
a plurality of elongated externally threaded sections being nonrotatahle connected in end to end relation and defining an elongated externally threaded element;
means rotatably supporting said elongated externally threaded sections in generally parallel relation on either side of said elongated area;
actuator motor means;
means establishing driving relation between said actuator motor means and one extremity of said elongated threaded element and causing rotational movement of said elongated externally threaded element responsive to movement of said actuator motor; and
traveler means being in engagement with said externally threaded element and being movable linearly upon rotational movement of said elongated externally threaded element, said traveler means being connected to at least one of said cover segments and causing linear movement of said cover mechanism to said covered and uncovered positions thereof.

9. A collapsible and extendable protective cover mechanism for selectively covering and protecting an elongated area, said protective cover mechanism comprising:
a pair of elongated guide track means being disposed in space, generally parallel relation on either side of said area to be protected;
a plurality of cover segments including generally upright and generally parallel side portions interconnected by a generally horizontal top portion, the lower portions of said side portions being received in movable guided relation by said guide track means;
a plurality of elongated, externally threaded sections being nonrotatably connected in end-to-end relation and defining an elongated externally threaded element, said externally threaded sections being joined in nonrotatable relation by male and female connection elements, said male and female connection elements cooperating to define intermediate support surfaces at the joints of said externally threaded sections, said intermediate support means providing rotatable support for said externally threaded elements at said joints and rotatably supporting said elongated externally threaded sections in generally parallel relation on either side of said elongated area;
actuator motor means;
means establishing driving relation between said actuator motor means and one extremity of said elongated threaded element and causing rotational movement of said elongated externally threaded element responsive to movement of said actuator motor; and
traveler means being in engagement with said externally threaded element and being movable linearly upon rotational movement of said elongated externally threaded element, said traveler means being connected to at least one of said cover segments and causing linear movement of said cover mechanism to said covered and uncovered positions thereof.

10. A collapsible and extendable protective cover mechanism as recited in claim 8, wherein:
a plurality of generally U-shaped support elements are supported in spaced relation along said elongated area;
each of said externally threaded sections are joined to adjacent threaded sections by nonrotatable connection means and cooperate to define support groove means at the joints between said sections, said generally U-shaped support elements receiving said support groove means and providing rotatable support for said joined threaded sections at said joints;
the threads of said threded sections being oriented to allow linear traversing of said traveler means over said joined sections, allowing said traveler means to traverse the entire length of said elongated externally threaded element; and said generally U-shaped support elements allow traversing of said traveler means over the supported joints between said threaded sections.

11. A collapsible and extendable protective cover mechanism as recited in claim 8, wherein:
- a cover segment at one extremity of asid protective cover mechanism defines a master segment;
- connection means establishes connection between said traveler means and said master segment and translates linear movement of said traveler means into linear movement of said master cover segment; and
- said master cover segment is adapted to impart operative movement to each of the various segments of said protective cover to cause selective covering and uncovering movement thereof.

12. A collapsible and extendable protective cover mechanism as recited in claim 1, wherein said area to be protected is defined by the bed of a transport vehicle having side walls on each side of said bed and said protective cover mechanism includes:
- a plurality of elongated guide track sections being connected to said side walls and oriented in end to end registering relation and defining said elongated guide track means; and
- guide roller means being connected at the lower extremities of said side portions of each of said plurality of cover segments and being receivable within said elongated guide track means, said guide roller means being capable of linearly traversing said registering track sections as said cover mechanism moves to the collapsed and extended positions thereof.

13. A collapsible and extendable protective cover mechanism as recited in claim 12, wherein said power actuator mechanism comprises:
- a plurality of elongated externally threaded sections being nonrotatably connected in end to end relation and defining an elongated externally threaded element;
- means rotatably supporting said elongated externally threaded elements in generally parallel relation on either side of said elongated area;
- actuator motor means;
- means establishing driving relation between said actuator motor means and one extremity of said elongated threaded element and causing rotational movement of said elongated externally threaded element responsive to movement of said actuator motor; and
- traveler means being in engagement with said externally threaded element and being movable linearly upon rotational movement of said elongated externally threaded element, said traveler means being connected to at least one of said cover segments and causing linear movement of said cover mechanism to said covered and uncovered positions thereof.

14. A collapsible and extendable protective cover mechanism for selectively covering and protecting an elongated area bed of a transport vehicle having side walls on each side of said bed, said protective cover mechanism comprising:
- a plurality of elongated guide track sections being connected to said side walls and oriented in end-to-end registering relation and defining said elongated guide track means;
- a plurality of cover segments including generally upright and generally parallel side portions interconnected by a generally horizontal top portion, the lower portions of said side portions being received in movable guided relation by said guide track means;
- guide roller means being connected at the lower extremities of said side portions of each of said plurality of cover segments and being receivable within said elongated guide track means, said guide roller means being capable of linearly traversing said registering track sections as said cover mechanism moves to the collapsed and extended positions thereof;
- a plurality of elongated, externally threaded sections being nonrotatably connected in end-to-end relation and defining an elongated, externally threaded element, said externally threaded sections are joined in nonrotatable relation by male and female connection elements, said male and female connection elements cooperating to define intermediate support surfaces at the joints of said externally threaded sections;
- intermediate support means provides rotatable support for said externally threaded element at said joints;
- means rotatably supporting said elongated externally threaded sections in generally parallel relation on said side walls either side of said elongated area;
- actuator motor means;
- means establishing driving relation between said actuator motor means and one extremity of said elongated threaded element and causing rotational movement of said elongated externally threaded element responsive to movement of said actuator motor; and
- traveler means being in engagement with said externally threaded element and being movable linearly upon rotational movement of said elongated externally threaded element, said traveler means being connected to at least one of said cover segments and causing linear movement of said cover mechanism to said covered and uncovered positions thereof.

15. A collapsible and extendable protective cover mechanism as recited in claim 14, wherein:
- a plurality of generally U-shaped support elements are supported in spaced relation along said elongated area;
- each of said externally threaded sections are joined to adjacent threaded sections by nonrotatable connection means and cooperate to define support groove means at the joints between said sections, said generally U-shaped support elements receiving said support groove means and providing rotatable support for said joined threaded sections at said joints;
- the threads of said threaded sections being oriented to allow linear traversing of said traveler means over said joined sections, allowing said traveler means to traverse the entire length of said elongated externally threaded element; and
- said generally U-shaped support elements allow traversing of said traveler means over the supported joints between said threaded sections.

16. A collapsible and extendable protective cover mechanism as recited in claim 15, wherein:

a cover segment at one extremity of asid protective cover mechanism defines a master segment;

connection means establishes connection between said traveler means and said master segment and translates linear movement of said traveler means into linear movement of said master cover segment; and said master cover segment is adapted to impart operative movement to each of the various segments of said protective cover to cause selective covering and uncovering movement thereof.

* * * * *